Figure 1:
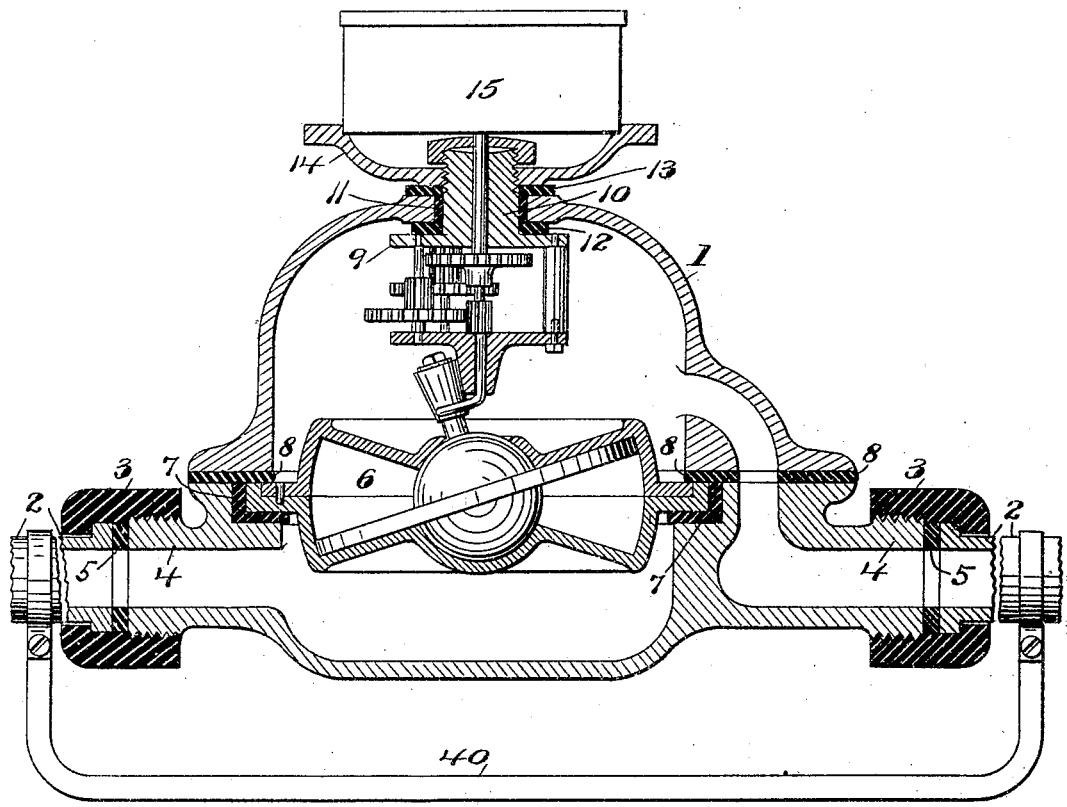

No. 764,603. PATENTED JULY 12, 1904.
F. LAMBERT.
WATER METER.
APPLICATION FILED APR. 28, 1902.
NO MODEL. 2 SHEETS—SHEET 1.

Attest:
Geo. H. Botts.
Mabelle F. Lake.

Inventor:
Frank Lambert
By Edith J. Griswold
Atty.

No. 764,603. PATENTED JULY 12, 1904.
F. LAMBERT.
WATER METER.
APPLICATION FILED APR. 28, 1902.
NO MODEL. 2 SHEETS—SHEET 2.
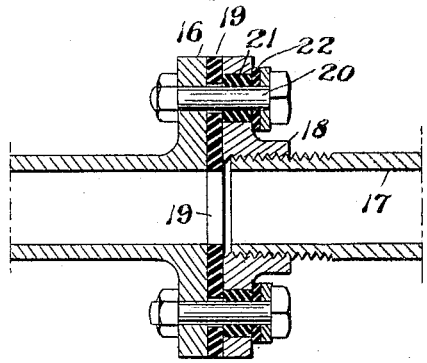
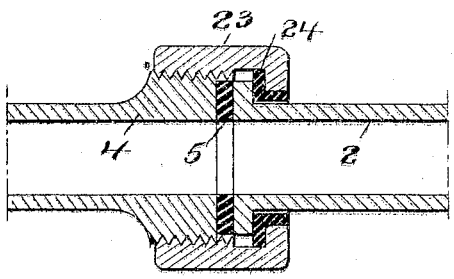
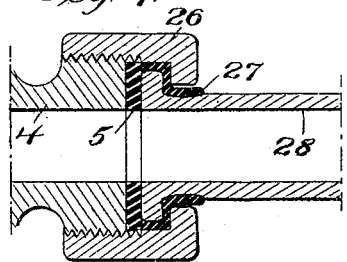
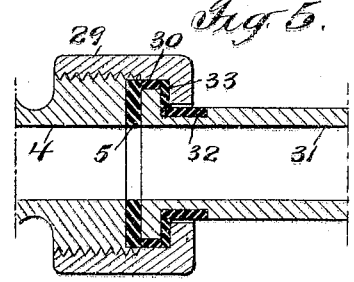
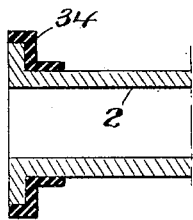
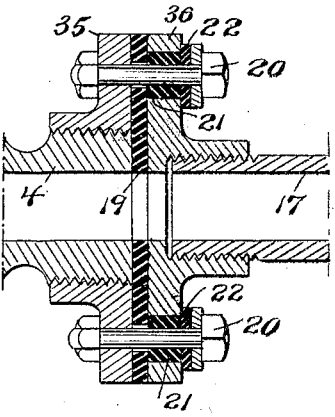
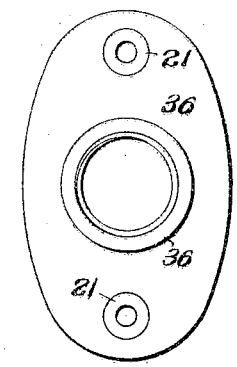
Attest:
Geo H Bott
Mabelle F. Lake.
Inventor:
Frank Lambert
By Edith J. Griswold
Atty.

No. 764,603.                                                          Patented July 12, 1904.

UNITED STATES PATENT OFFICE.

FRANK LAMBERT, OF BROOKLYN, NEW YORK.

WATER-METER.

SPECIFICATION forming part of Letters Patent No. 764,603, dated July 12, 1904.

Application filed April 28, 1902. Serial No. 105,064. (No model.)

*To all whom it may concern:*

Be it known that I, FRANK LAMBERT, a citizen of the United States, and a resident of New York city, borough of Brooklyn, Kings county, State of New York, have invented Improvements in Water-Meters, of which the following is a specification.

This invention relates to improvements in the mode of connecting water-meters or other translating device to water service-pipes, and more especially for the purpose of preventing electrolysis, which is hurtful or destructive to the meter or other translating device which may be interposed between the two ends of the service-pipe. For the last decade this question of electrolysis has been one carefully considered by people in connection with water departments on account of its destructive effect on the pipes and other translating device connected to the service-pipe, as valves, fish-traps, meters, &c. By experiment I have found that in a meter composed of metals of different nature or even different alloys, as bronze composition and common brass, if certain parts are insulated from the other parts of the meter or the service-pipe, while the metallic parts in the meter in direct electrical connection with the pipes are badly affected by the galvanic or electrolytic action, the metallic parts which are insulated are entirely preserved from any such destructive action. I have even found that parts made of common brass or German silver, which are very easily affected when in direct electrical connection with the pipes, are entirely preserved when all the other parts in the meter made of the same or better material after a comparatively short time are so badly oxidized that they drop down in powder. I take advantage of this discovery to construct my meter or other translating device that can be attached to the service-pipe with means for insulating the connection between the meter and the service-pipe. This can be done in many different ways without departing from my invention; but I have shown here in the present drawings several arrangements that can be used to reach the desired result.

In the accompanying drawings, Figure 1 is a central sectional elevation of one form of water-meter made according to my invention. Figs. 2 to 7 are central sections through water-service pipes, showing various ways of insulating two sections of a pipe, one of which sections may be part of a meter; and Fig. 8 is an end view of a flange-piece shown in Fig. 7.

Referring to Fig. 1, meter-casing 1 is represented as being connected to the water service-pipe 2 by a connection that electrically insulates the two parts. Instead of making the nut 3, that connects the threaded spud 4 of the meter to the pipe 2, of metal, as usual, I make this nut of hard rubber proportionately thicker in order to stand the strain necessary to form a good joint by the intermediary of a leather washer 5 between the end of the pipe and the meter. The measuring mechanism and the registering device in this meter are also shown as being electrically insulated from the service-pipe by being so mounted in the casing 1 that these parts are insulated from the casing. The lower section of the casing 1 is provided with a seat for the measuring-chamber 6, the seat proper being formed by a flanged ring 7, of insulating material, fitted or molded in a recess in the casing and adapted to prevent any electrical connection between the lower section of the casing and the measuring-chamber. A packing-ring 8, interposed between the upper and lower sections of the casing 1 and pressed down against the upper side of the flange of the measuring-chamber 6 by the upper section of the casing, holds the measuring-chamber in position and insulates it from the upper section of the casing, while at the same time making a good joint between the sections of the casing and between the casing and the measuring-chamber.

In the meter shown the reducing-gear is represented as suspended from the top of the casing 1, and the support, which also forms the connection for the registering device, is constructed to prevent all electrical connection between the casing 1 and the reducing-gear and registering mechanism. The upper gear-plate 9 of the reducing-gear frame is formed with a boss 10, threaded at its upper end, which boss 10 is passed through an opening in the upper section of the casing 1, a ring 11, of insulating material, being interposed between said opening and the boss 10. Soft packing 12 is placed between the upper gear-plate 9 and the casing. An insulating-washer 13 is placed on the boss 10 over the casing, and the support 14 for the register-box 15 is screwed down on the boss 10 to compress the packing for making a tight joint and for holding the parts in proper position. It will be seen that the insulating-ring 11, the packing 12, and the insulating-washer 13 completely disconnect electrically the reducing-gear and the registering device from the casing.

In Figs. 2 to 8 I have shown various other arrangements of electrically insulating connections that may be used to my invention between sections of water service-pipes or other devices establishing a continuous water connection.

Fig. 2 represents a portion of a meter-spud having a flanged end 16 connected to the service-pipe 17 by a flanged nut 18. Both flanges are of metal, and interposed between them is an insulating-packing 19, such as heavy cardboard, packing-rubber, or fiber. In one of the flanges in the holes through which the bolts 20 are to pass to clamp the two flanges together I insert an insulating-tubing 21 and below the head or the nut of the bolt I also put an insulating-washer 22. When the flanges are tightened together by means of the bolts, there will be no electrical connection between the service-pipe and the meter proper.

In Fig. 3 I have shown a metallic nut 23 with hard rubber 24 vulcanized right into the nut, so that with the packing 5 all electrical connection between the service-pipe 2 and the meter proper is prevented.

Fig. 4 shows a plain metallic nut 26, the insulating material 27 being molded on the service-pipe 28 at the point necessary to prevent electrical connection.

Fig. 5 shows a connection with plain metallic nut 29 and insulating material 30 molded around the external periphery of the flange of the pipe 31 and at the smallest portion at 32. Close to its flange I interpose two insulating-washers—one, 5, to act as packing and the other, 33, to prevent the contact between the bottom of the nut 29 and the face of the pipe.

Fig. 6 shows a very simple way to insulate the parts by making a loose thimble 34, of insulating material, just to pass over the service-connection tube 2 before the meter is bolted together.

Fig. 7 shows a good way by which the meters of small size now in use can be insulated from the service-pipe. The habit has been to make these meters with a threaded spud 4, as shown, Fig. 1, and by screwing an oval flange 35 over the spud of the meter. Another flange 36, of corresponding size and shape, can also be directly mounted on the service-pipe 17. The same arrangement as shown in Fig. 2 can be used with Fig. 7 to insulate the service-pipe from the meter or any other device which can be there attached. This arrangement on account of its simplicity and the strength of the parts might be found more preferable for meters now in service than the arrangements shown in Figs. 1 to 6.

Fig. 8 represents the flange 36, with the insulating-tubing 21 in the bolt-holes.

It will be easy to understand from the preceding figures and description that only one of these connections requires to be insulated; but for the object of safety it will be preferable in a majority of cases to insulate both ends.

While I have shown a way to disconnect the meter electrically from the service-pipe, I might further say that to get the full advantage of this device the meter-case must not be in connection with the ground; otherwise the current will pass from the pipe to the ground and again to the casing of the meter. It will be preferable to let the meter rest on a dry board, brick, or other insulating material, but not on the ground, or have the meter suspended without contact with the ground at all, which can be easily done, especially for small-size meters.

While the measuring mechanism and the registering device are shown as insulated from the casing, such construction is not essential, if the casing is insulated from the service-pipe. For further protection an electric by-pass 40 may connect the service-pipe outside the meter to prevent the jumping of the current from the service-pipe at the insulated part to the ground or other conducting medium and back again.

I claim as my invention—

1. In a water-meter, the combination of an external pressure-casing, with internal measuring mechanism secured therein, said measuring mechanism being electrically insulated from said external casing.

2. In a water-meter, the combination of an external pressure-casing, with registering mechanism secured therein, said registering mechanism being electrically insulated from said external casing.

3. The combination with a water service-pipe of a water-meter connected to said service-pipe but electrically insulated therefrom, and an electrical by-pass connecting the service-pipe around the meter.

In testimony whereof I have signed my name to this specification in the presence of two subscribing witnesses.

FRANK LAMBERT.

Witnesses:
 MABELLE F. LAKE,
 EDITH J. GRISWOLD.